US010768194B2

(12) United States Patent
Abuella et al.

(10) Patent No.: US 10,768,194 B2
(45) Date of Patent: Sep. 8, 2020

(54) SYSTEM AND METHOD FOR SPEED ESTIMATION, DETECTION AND RANGING USING VISIBLE LIGHT IN VEHICLES

(71) Applicants: The Board of Regents for Oklahoma State University, Stillwater, OK (US); Özyeğin University, Cekmekoy-Istanbul (TR)

(72) Inventors: Hisham Fadlallah M. Abuella, Stillwater, OK (US); Sabit Ekin, Stillwater, OK (US); Murat Uysal, Istanbul (TR)

(73) Assignees: THE BOARD OF REGENTS FOR OKLAHOMA STATE UNIVERSITY, Stillwater, OK (US); OZYEGIN UNIVERSITY (TR)

(*) Notice: Subject to any disclaimer, the term of this patent is extended or adjusted under 35 U.S.C. 154(b) by 295 days.

(21) Appl. No.: 16/057,239

(22) Filed: Aug. 7, 2018

(65) Prior Publication Data
US 2019/0041419 A1 Feb. 7, 2019

Related U.S. Application Data

(60) Provisional application No. 62/541,913, filed on Aug. 7, 2017.

(51) Int. Cl.
*G01P 3/36* (2006.01)

(52) U.S. Cl.
CPC .................. *G01P 3/36* (2013.01)

(58) Field of Classification Search
CPC .................................... G01P 3/36
See application file for complete search history.

(56) References Cited

U.S. PATENT DOCUMENTS

| 10,222,474 B1* | 3/2019 | Raring | H01S 5/02212 |
| 2004/0143380 A1* | 7/2004 | Stam | B60Q 1/085 701/36 |
| 2018/0364158 A1* | 12/2018 | Wang | G06K 9/2018 |
| 2019/0154439 A1* | 5/2019 | Binder | G01S 15/08 |

* cited by examiner

*Primary Examiner* — Matthew G Marini
(74) *Attorney, Agent, or Firm* — Fellers, Snider, Blankenship, Bailey & Tippens, P.C.; Terry L. Watt

(57) ABSTRACT

There is provided herein a visible light-based speed estimation method ViLDAR. By using the received light intensity of a vehicle's LED headlight, the vehicle speed can be accurately estimated for a wide range of incidence angle. Linear LS method is used in one embodiment of a speed estimation algorithm. The impact of system parameters on speed estimation error and the performance of algorithm for different speed and estimation duration are provided. Some embodiments operate best at a certain distances where the received light intensity (power) reading can provide estimation results with high accuracy, which distances are termed a reliable region of operation. In addition to speed estimation, potential applications of ViLDAR idea are ranging detection and collision avoidance for autonomous vehicles.

15 Claims, 6 Drawing Sheets

SYSTEM AND METHOD FOR SPEED ESTIMATION, DETECTION AND RANGING USING VISIBLE LIGHT IN VEHICLES

CROSS REFERENCE TO RELATED APPLICATIONS

This application claims the benefit of U.S. Provisional Patent Application Ser. No. 62/541,913 filed on Aug. 7, 2017, and incorporates said provisional application by reference into this document as if fully set out at this point.

TECHNICAL FIELD

This disclosure relates generally to determining the speed of a moving object and, more specifically, to systems and methods for determining the speed of a moving vehicle using visible light in vehicles.

BACKGROUND

Keeping roads safe is a priority for engineers from different fields. It is well-known that one of the main causes of traffic accidents is speeding. Therefore, traffic regulation agencies around the world utilize technological improvements such as speed detectors to impede drivers from speeding. Additionally, most vehicle manufacturers use light emitting diode (LED) headlights because of their special advantages, i.e., long life time, energy efficiency, and short rise time, which made them a suitable candidate to replace the existing lighting systems in the automotive industry. Furthermore, many research results show that due to inclement weather conditions and easiness of spotting oncoming traffic, daytime running lights in vehicles can decrease the accidents rate up to 28% for multi-vehicle and pedestrian accidents. Therefore, the automotive industry has started to equip their vehicles with daytime running lights, particularly for the vehicles with LED headlights due to being a power-efficient solution.

A well-known method for vehicle speed estimation is using the Radio Detection And Ranging (RADAR) system. Depending on the application and scenario, a RADAR system can be used for either detecting a moving object or estimating its speed [4]. A similar system (in principle) that uses the same technique of the RADAR but works on a different part of the electromagnetic radio spectrum is Light Detection And Ranging (LiDAR). The basic idea behind RADAR and LiDAR is to estimate speed from the frequency and travel time of reflected waves. Among various challenges, the beam-width and angle-of-arrival are the most critical ones and have high impact on the estimation accuracy of these systems [5]. Indeed, narrow beam-width is required for accurate speed estimations. It is also well-known that drivers can easily acquire the commercially available RADAR warning equipment/devices (as deeply explained in [6]). These devices detect the presence of RADAR/LiDAR (also known as speed gun or RADAR gun) and warn the driver to avoid traffic fines for speeding, which is illegal and an undesired situation. Further information about the limitations of state-of-the-art RADARs is given in [7].

In the context of Intelligent Transportation Systems (ITSs), researchers have been investigating the autonomous and smart vehicular to vehicular (V2V) communication in order to improve vehicles safety systems. The idea of using visible light communication (VLC) in the V2V communication is quite recent and has become attractive for various reasons; 1) availability of the hardware (LEDs) in vehicles, and 2) usage of a radio frequency (RF) system for the V2V communication can be inefficient due to interference, spectrum and power usage. There are numerous studies in the literature which have utilized VLC principles in V2V communication systems (see [8]-[14], references therein.)

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

Various embodiments of a Visible Light Detection and Ranging system are taught herein, collectively ViLDAR. One embodiment of the ViLDAR system utilizes visible light variation during a known time difference according to various embodiments. The use of light emitting diodes (LED) in vehicles lighting systems has become increasingly common in the automotive industry. Concurrently, monitoring drivers' speed constitutes a critical issue for safety regulation agencies and automotive industry. Most of speed monitoring systems are based on measuring the speed of vehicles using a well-known RADAR or LiDAR system that uses RF signal or laser signals, respectively. However; these systems have limitations such as their requirement of narrow beam-width and line-of-sight, and their deficient performance in curved roads.

Herein are presented various embodiments of an estimation method for determining the speed of an approaching vehicle on a road given only the received light intensity information obtained from the vehicle's headlights by a detector. In one embodiment, and assuming a Lambertian channel model for the light wave propagation, the performance of the estimator is compared in different angle of incidence between the vehicle and the ViLDAR. The linear least square (LS) fitting method provides more efficient and stable results in different signal-to-noise-ratio values. The proposed method outperforms RADAR/LiDAR when there is a cosine angle effect and works in curved roads. Certain embodiments outperform RADAR/LiDAR systems in terms of speed estimation accuracy for a wide range of incidence angles.

According to an embodiment, the vehicle's LED headlight(s) works as a transmitter. As long as the vehicle light is in ViLDAR's field-of-view (FOV) (which is similar to beam-width in RADAR), the angle of arrival has low impact on estimation accuracy.

An embodiment is capable of measuring/estimating the speed of an approaching vehicle using the variation of the received light power of the vehicle's headlight, an approach that has not been investigated previously.

Compared herein is the performance of an embodiment to the theoretical performance of the LiDAR/RADAR systems. It was found that ViLDAR provides better performance results than RADAR/LiDAR system under certain assumptions discussed below.

According to another embodiment, in addition to speed estimation, potential applications of the ViLDAR approach are ranging detection and collision avoidance for autonomous and driver assisted vehicles.

Among the advantages of the system taught herein are:

ViLDAR is a relatively low-power ranging and detection system that reflects on good battery efficiency.

There is less noise and path loss compared to two-way model.

ViLDAR performs better in a large incident angle and in scenarios where the incident angle is varying fast, e.g., in curved road scenarios.

The size and weight of the ViLDAR system will be smaller and lighter than current handheld law enforcement RADAR guns.

Unlike RADAR guns, the ViLDAR system cannot be detected by drivers when used by law enforcement officers.

Since ViLDAR uses visible light, it is not affected by RF interference and does not interfere with other RF systems.

The following is generally organized as follows. First, the system model and the path-loss channel model used in the simulations are provided. Second, the utilized estimation methods are presented. Following that, some background on RADAR/LiDAR speed calculation methods and their limitations are discussed. Finally, simulation parameters and results are presented, while conclusions are drawn in the last section The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Figure 1:
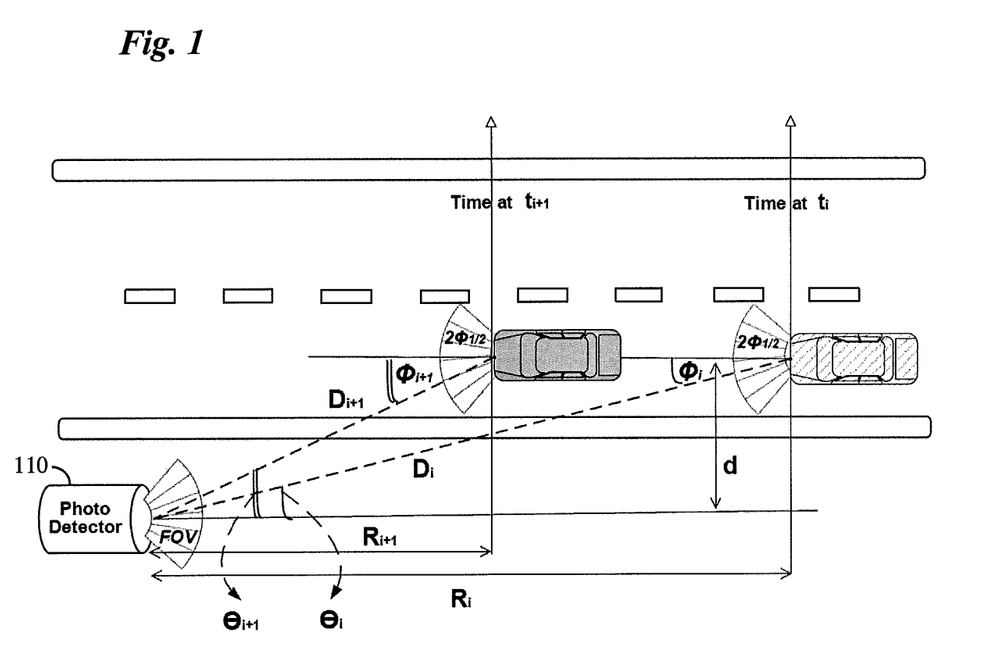
FIG. 1 contains an embodiment of a ViLDAR system model wherein the speed of a vehicle is estimated using power variations in visible light.
Figure 3:
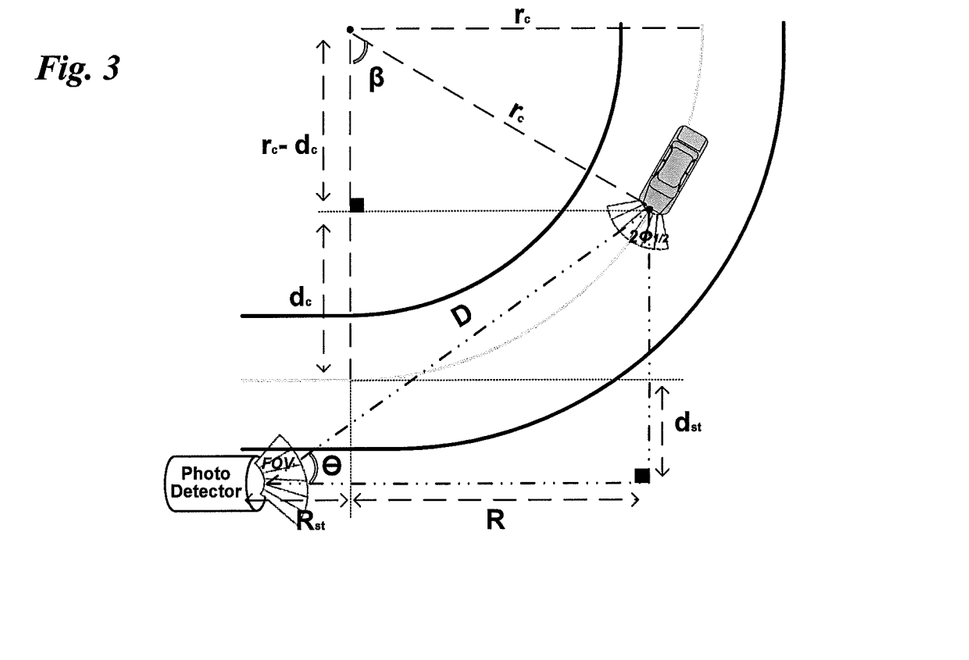
FIG. 3 contains an embodiment of some parameters associated with a speed detection/estimation scenario in a curved road.

An embodiment of a system model is depicted in FIGS. 1 and 3, where $\theta$ and d are the incidence angle, and the vertically projected distance between the vehicle and the photodetector ("PD"), respectively. Likewise, $R_i$ and D, are the horizontally projected distance and the actual distance between the vehicle and the PD at time $t_i$, respectively. To avoid confusion, D and R will be referred to as distance and range below. Moreover, the subscripts i and i+1 will be used to indicate values of the corresponding parameter at time instances $t_i$ and $t_{i+1}$, respectively.

In FIG. 3, $r_c$ is the curvature radius of the road, $\beta$ is an angle that is changing with respect to the angular velocity of the car, $$\omega = \frac{V}{r_c},$$

and V is the vehicle speed. In this scenario, both the horizontal distance from ViLDAR to vehicle $d_c$ and vertical distance R change with respect to $\beta$. In addition, $d_{st}$ and $R_{st}$ are the horizontal and vertical distances between ViLDAR and the end of the curved road, respectively.

As shown in the figures, the PD in an embodiment of the ViLDAR system will take different measurements at different time instants, hence at different D and R from the detector. The received power tends to increase as vehicle approaches the PD. Given the channel model, the speed estimation problem can be interpreted as designing an estimator to obtain the slope of the received power. See, e.g., FIG. 5. This approach makes it possible to estimate the speed of the vehicle. For purposes of the instant embodiment, it will be assumed that the vehicle moves with constant velocity. It is further assumed that (1) vehicle's light source (LED in this case) transmits with a constant power (luminance); (2) that only a single vehicle is in the field of view of the PD during the measurements, e.g., it will be assumed that that there is a some distance between vehicles traveling on the same road; (3) ViLDAR's FOV is assumed to be 70°; and 4) the space between the two headlamps in the vehicle is small, hence it can be assumed that the vehicle effectively has a single transmitter. Of course, the instant system can readily be adapted to instances where more than one vehicle is approaching by adjusting the position or FOV of the PD to focus on a single lane.

The VLC channel model presented below which considers mobility scenarios for the received power in case of visible light scenarios is utilized in one embodiment. The two channel models that are used herein are as follows.

Simulated Channel Model

In the simulated channel model, a simulation platform of the outdoor environment that integrates the CAD models of building, vehicles and any other objects within is constructed. The type of object surface materials (coating) and the types of reflections, i.e., purely diffuse, specular and mixed reflections is also specified. The specific type of reflection is defined by scatter fraction parameter. "Mie scattering" is further used to model clear weather conditions. "Bulk scatter" method in the software allows providing the input parameters "particle index" (the refractive index of particles), "size" (the radius of the spherical particles) and "density" (the density of particles).

After the simulation environment has been established, a ray tracing operation is used to determine the CIR (i.e., channel impulse responses). A nonsequential ray tracing tool is used to generate an output file, which includes the detected power and path lengths from source to detector for each ray. This information was used to form an expression for the CIR as follows:

$$h(t) = \sum_{i=1}^{N_R} P_i \delta(t - \tau_i),$$

where $P_i$ is the power of the ith ray, $\tau_i$ is the propagation time of the ith ray, $\delta(t)$ is the Dirac delta function, and $N_r$ is the number of rays received at the detector.

The received optical power is given as $P_r(t)=P_t-PL$, where $P_t$ is the transmitted optical power and PL is expressed as:

$$PL = 10\log_{10}\left(\int_0^\infty h(t)dt\right)$$

In the simulated channel model, the power-distance relation is given by $$P_r(t) = K[D(t)]^{-\delta}, \text{ for } D(t) > 1,$$

where $P_r(t)$ is the power level received from the vehicle at time t, and K is a constant that represents all the gains and the transmitted power, $\gamma$ is the channel path-loss exponent which usually depends on the channel environment, and $D(t)$ is the distance between the vehicle and the ViLDAR at time t.

For purposes of the current discussion, it will be assumed that the coating materials of buildings, traffic light poles and street lamp poles are respectively concrete, aluminum metal and galvanized steel metal. The coating material of cars will be assumed to be black and olive green gloss paint. The road type is assumed to be R3 with the coating material of asphalt.

Figure 8A:
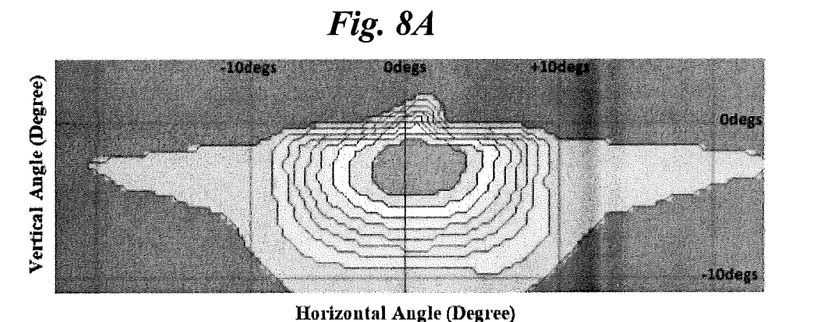
FIGS. 8A and 8B contain an exemplary spatial distribution for a light source (FIG. 8A) and cross sections indicated by C0°-C180°, C90°-C270° and C135°-C315° planes (FIG. 8B).
Figure 8B:
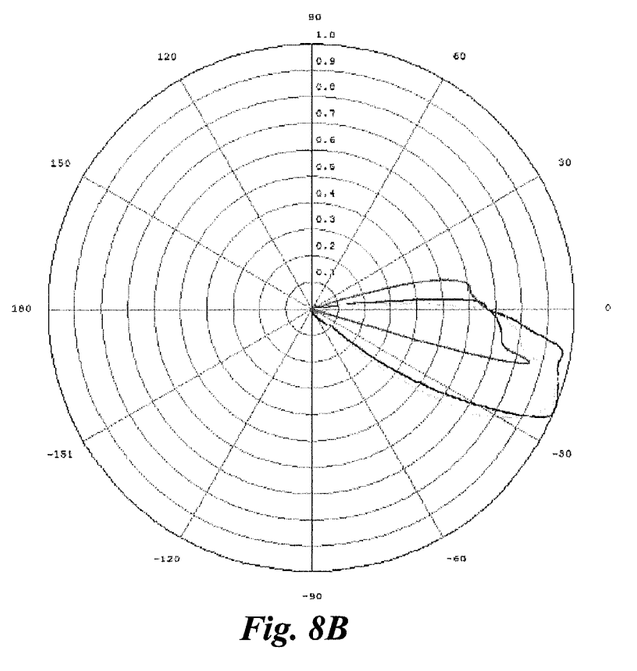

Philips Luxeon Rebel™ automotive white LEDs were used as the low-beam headlamp with the spatial distribution shown in FIG. 8A. Due to asymmetrical intensity distribution of luminaire, different cross sections indicated by C0°-C180°, C90°-C270° and C135°-C315° planes are shown in FIG. 8B. In this variation, the headlamp with total power normalized to unity is placed in the front side of the vehicle as the transmitter and the PD with 1 cm² area and FOV of 70° is placed on the sidewalk (e.g., see FIG. 1).

Under the assumption that the vehicle is moving toward the detector, CIRs were obtained through all points at a 1 meter inter-sample distance over the driving direction for the car for a range of 10 meters. In order to obtain values for K and γ, curve fitting techniques were applied to the calculated path loss which, in this example, involved minimization of root mean square error. Some typical values for coefficients $K_{dB}$ and rare presented in Table I below. The Lambertian channel model is also included as a benchmark (i.e., the hypothetical case).

TABLE 1

Channel parameters for Lambertian and simulated channel models

|  | $K_{dB}$ | γ |
|---|---|---|
| Lambertian Channel Model | −41.39 | 1.673 |
| Simulated Channel Model | −49.32 | 1.210 |

Lambertian Model

In this model, the power-distance relation is given by:

$$P_r(t) = \frac{(n+1)A_R P_t}{2\pi[D(t)]^\gamma}\cos^n(\phi(t))\cos(\theta(t)), \text{ for } D(t) > 1,$$

where $P_t$ is the transmitter power and $A_R$ is the optical detector size. $\phi(t)$ and $\theta(t)$ are irradiance and incidence angles at time t, respectively. In addition, $\phi_{1/2}$ is the FOV (also referred to as the half-power angle), and n is the order of the Lambertian model and is given by $$n = -\frac{\ln(2)}{\ln(\cos\phi_{1/2})}.$$

Under the assumption that the transmitter and receiver are at approximately the same height, it follows that:

$$\theta(t)=\phi(t), \forall t,$$

where $0<\theta(t)<\phi_{1/2}$ This can be further simplified to yield:

$$P_r(t) = \frac{(n+1)A_R}{2\pi[D(t)]^\gamma}\cos^{n+1}(\theta(t)).$$

Finally, in order to derive $P_r(t)$ in terms of $D(t)$, the foregoing can be further simplified by defining the constant K to be $$K = \frac{(n+1)A_R}{2\pi}.$$

Note that $$\cos(\theta) = \frac{\sqrt{[D(t)]^2 - d^2}}{D(t)},$$

where d is the vertical distance in FIG. 1 from a line extending from the center of the field of view of the detector to the center of the source automobile. More generally, d can be defined as the distance between the vehicle line of motion and the position of the PD. Setting $$C = \frac{(n+1)A_R}{2\pi},$$

the previous expression can be simplified as follows:

$$P_r(t) = \frac{C}{[D(t)]^\gamma} \left( \frac{\sqrt{[D(t)]^2 - d^2}}{D(t)} \right)^{n+1}.$$

Figure 2:
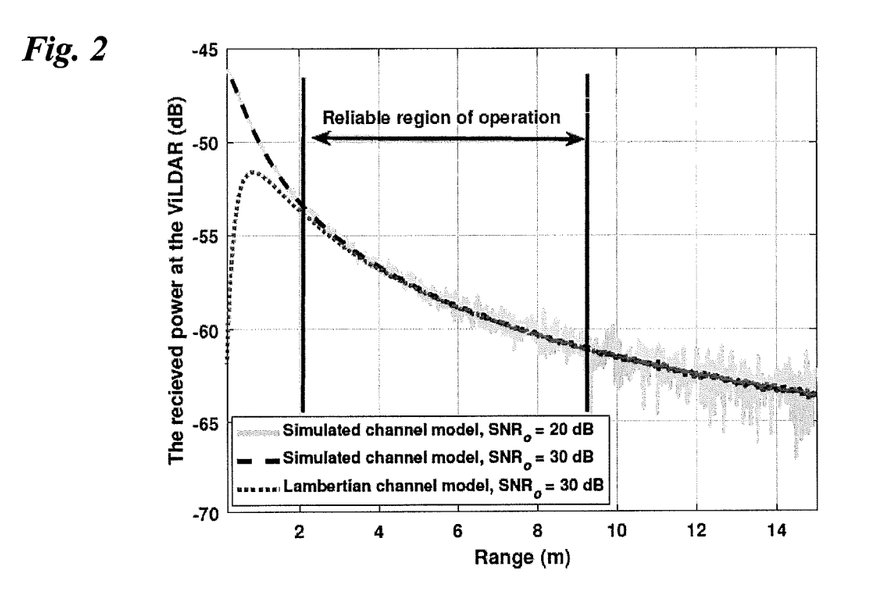
FIG. 2 contains an example of the power received from a vehicle under the two channel models with initial range $R_0=15$ m; Speed=72 km/hr; d=0.5 m; $P_t=70$ dB.

In FIG. 2, the simulated channel model and Lambertian channel models are compared. For purposes of comparison, the same parameter values are used in both models. For instance, the constant K has been set to the same value as the constant C and with the same path-loss exponent γ. The Lambertian model is provided for different initial signal-to-noise-ratios (SNRs) as 20 and 40 dB to show the impact of noise level. The initial point is at time 0, and as the vehicle approaches the detector, new measurements are taken, i.e., time increases. As expected, in both models the received power increases as the vehicles approaches the detector. Further, although the estimation can be performed from all the received power levels, high accuracy of speed estimation can be obtained in certain region, which is shown as the reliable region of operation in FIG. 2.

Given the channel models, the speed estimation problem can be interpreted as designing an estimator to obtain the slope of the received power (see FIG. 2), hence providing an estimate of the speed of the vehicle.

Figure 10:
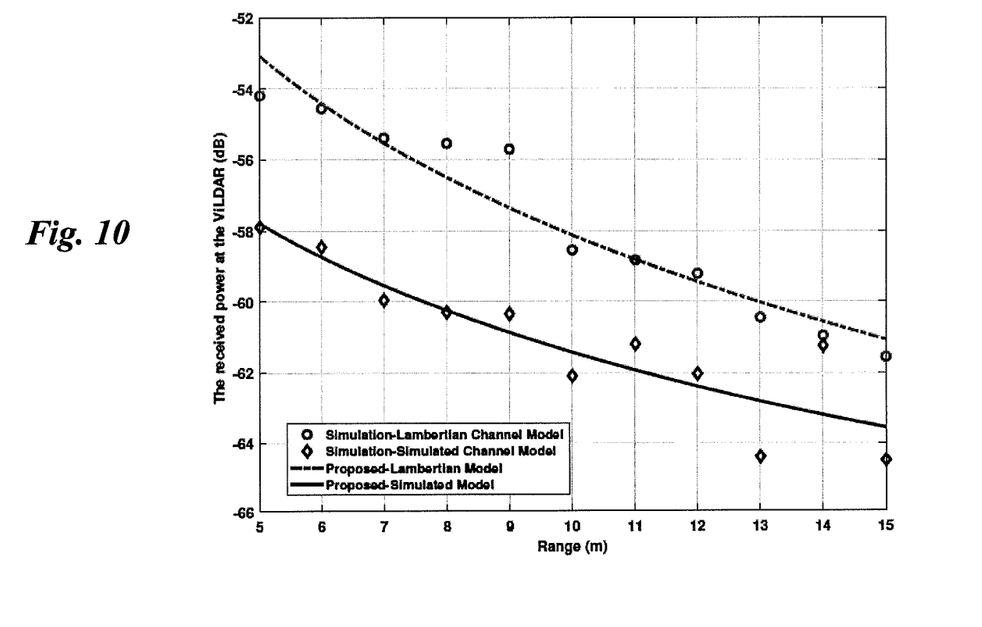
FIG. 10 contains an exemplary plot of path loss versus distance for different channel models.

FIG. 10 contains a plot of path loss versus distance for the channel models under consideration. It is observed from FIG. 10 that the path loss obtained with Lambertian channel model is underestimated with respect to the simulated channel model. This is a result of the fact that in the simulated channel model more reflected rays from the road surface are received.

In FIG. 2, Lambertian and simulated channel models are compared. The same parameter values are used in both models. For instance, the constant C has been set equal to the constant K, and the same has been done for path-loss exponent. The simulated channel model is provided for different initial signal-to-noise-ratios (SNRo), i.e., at 20. dB and 30 dB, to show the impact of noise level.

The initial point is at time 0, and as the vehicle approaches the detector, new measurements are taken, i.e., as the distance decreases additional samples are acquired.

As expected, in both models the received power increases as the vehicle approaches the detector. Although speed estimation could be performed using any received power level, higher accuracy of the speed estimate can be obtained in certain regions, as, for example, is shown as the reliable region of operation in FIG. 2.

Speed Estimation

Two methods for estimating the speed in the simple channel model according to some embodiments are as follows.

(1) Calculating Distance per Measurement.

In this embodiment, the distance is first calculated, D(t), for each measurement of received power, $P_r(t)$, at time t in logarithmic domain:

$$P_r(t)_{dB} = 10 \log_{10}(C) - 10\gamma \log_{10}(D(t)).$$

Then, the distance, D, at any time t can be given by $$D(t) = 10^{\frac{\log_{10}(C) - 0.1 P_r(t)_{dB}}{\gamma}}.$$

Knowledge of the ΔD and Δt between the two measurements allows us to obtain the instantaneous speed $V = \Delta_{Di}/\Delta t_i$. Additionally, the estimated instantaneous speed values, $V_i$, can be averaged for more accurate results.

One disadvantage of this method is that it is dependent on the signal values; hence, the estimation is potentially impacted by noise levels.

(2) Linear Least Square (LS) Estimation.

Under the assumption of constant speed during the estimation period and a straight road, D(t) can be expressed in terms of speed and time as $$D(t) = \sqrt{d^2 + (R_o - Vt)^2},$$

where $R_0$ is the initial range between the vehicle and the ViLDAR light detector. It follows that:

$$P_r(t) = K(d^2 + (R_o - Vt)^2)^{\frac{-\gamma}{2}}.$$

Rearranging results in linear model (y=Vx+R₀), yields $$\sqrt{\left(\frac{P_r(t)}{K}\right)^{\frac{-2}{\gamma}} - d^2} = -Vt + R_o,$$

where y can be considered as an n-samples vector of $$\sqrt{\left(\frac{P_r(t)}{K}\right)^{\frac{-2}{\gamma}} - d^2}$$

and each value in y corresponds to a value in vector x (n-samples of negative value of time). Then, this can be expressed in vector-form as $$y = [x, 1][V, R_o]^T,$$

where 1 is a vector of 1's of size (n,1). Then, by letting b=[V,R₀] with size (2,1) and A=[x,1] with dimension (n, 2), it follows that $$y = Ab.$$

V and R₀ can be readily estimated by using the LS inverse formula as:

$$b = [A^T A]^{-1} A^T y.$$

Figure 9:
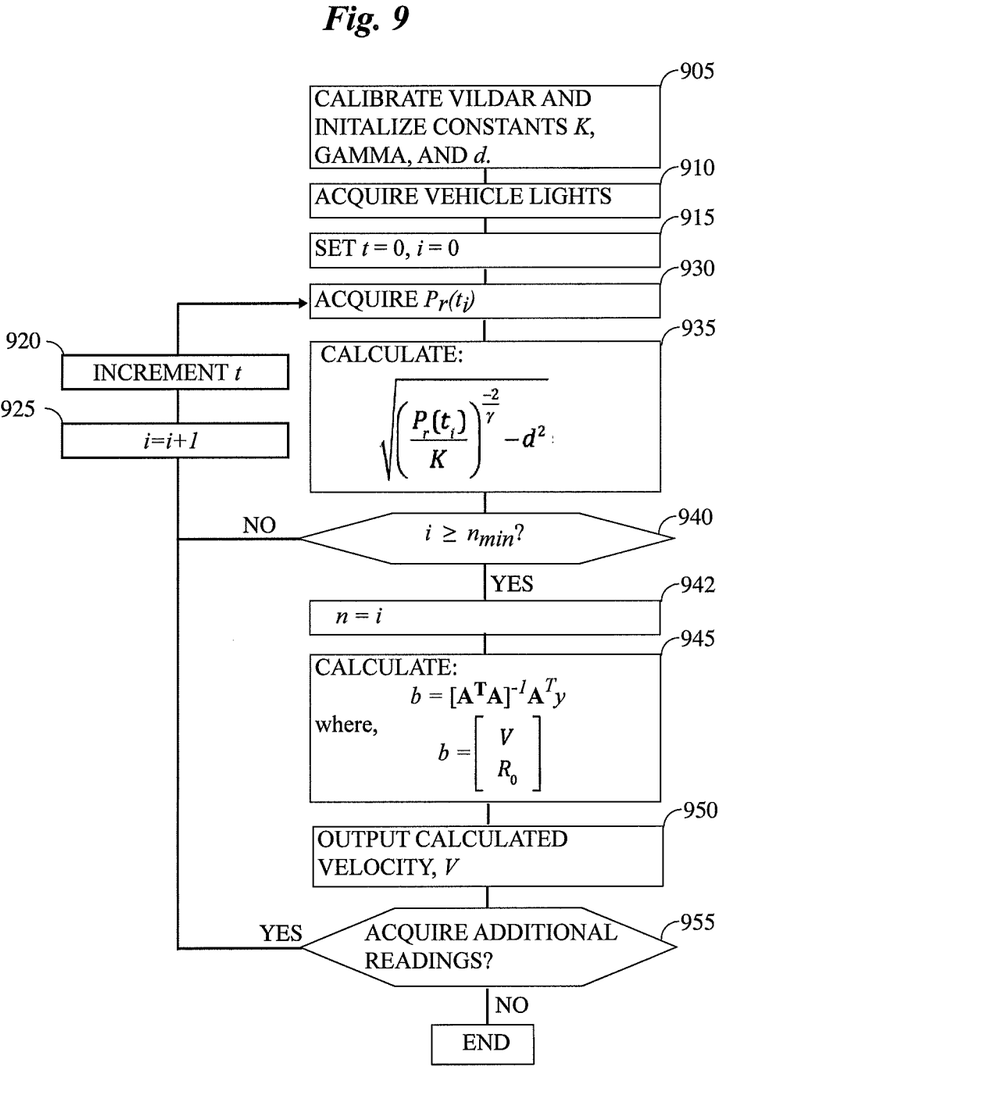
FIG. 9 contains an operating logic suitable for use with an embodiment.

Thus, the problem of estimating velocities using the received power of the transmitted light from the vehicle has been linearized. Note that although a least squares minimization has been suggested above, that is just one approach to solving to solving this problem. More generally, note that boxes 935 and 945 have been customized to reflect the use of least squares as a curve fitting technique. Of course, other curve fitting techniques could also be used including, by way of example only, maximum likelihood, minimization based on the L1 norm, etc. Those of ordinary skill in the art will readily be able to adapt the techniques taught herein to instances where alternative norms are used in the solution.

The LS model can be updated using the Lambertian channel model as:

$$P_r(t) = \frac{(n+1)A_R P_t}{2\pi[D(t)]^\gamma}\cos^{(n+1)}(\theta(t)).$$

Setting $$K = \frac{(n+1)A_R P_t}{2\pi},$$

which is a constant value, it follows that:

$$P_r(t) = K[D(t)]^{-\gamma}\cos^{(n+1)}(\theta(t)).$$

Assuming that $\cos(\theta(t))$ is approximately equal to 1, the same methodology can be followed as was used in the simple channel model, the main difference being the constant parameter K.

As shown in FIG. 3, the curved road scenario has a different setup and parameters than straight road scenario. Hence, a different method is used to estimate the speed. First, the $\beta$ angle for each sample received power is estimated using minimum square error (MSE). Then, the linear LS estimation method is used to estimate the angular velocity. Then the variables in the previous equation are expressed as functions of $\beta$.

To simply the analysis assume that $R_{st}$ and $d_{st}$ are zero, i.e., the ViLDAR is at the end of the curvature of the road. Using basic trig identities, it can be shown that $$P_r(\beta) = \frac{K(\cos(\beta/2))^{n+1}}{(2r_c\sin(\beta/2))^\gamma}.$$

To estimate the $\beta(t)$ for each measurement of $P_r(t)$, in this embodiment the cost function, $g(\beta)$, is minimized, where $$g(\beta) = (P_{r,sim} - P_r(\beta))^2|.$$

Substituting $P_r(\beta)$ into the cost equation yields $$g(\beta) = \left(P_{r,sim} - \frac{K(\cos(\beta/2))^{n+1}}{(2r_c\sin(\beta/2))^\gamma}\right)^2.$$

Next, the angular velocity (w) will be estimated, given that $\beta = \beta_0 - wt$. The parameter w and $\beta_0$ can then be estimated using the linear least squares equation used above for the straight road case. Once the angular velocity has been estimated, it is straightforward to find the vehicle speed given the radius of curvature.

RADAR/LIDAR
Principles

The basic approach used by RADAR/LiDAR is to calculate the difference between the transmitted and received (after reflection) signal in frequency and time. In RADAR systems, an RF signal is used while the LiDAR system is laser based. One of the most common utilizations of a RADAR system is speed detection for traffic control and regulations. In addition, numerous methods have been studied and applied to improve detection accuracy. Nevertheless, there are still challenges and important factors that impact estimation accuracy. The well-known challenges are the impacts of the line-of-sight (LOS) and narrow beam-width requirements (i.e., the angle between the detector and the target) on the estimation accuracy. Therefore, the speed measurements by RADAR systems are only reliable for a certain distance, angle, and availability of LOS.

Cosine Effect

RF- and laser-based speed detectors estimate the speed of a vehicle that is moving towards the detector. A simplified relation between the measured speed ($V_m$) and the actual speed ($V_a$) is given by:

$$V_m = V_a \cos(\theta),$$

where $\theta$, as defined in FIG. 1, is the angle between the detector and the direction of motion of the vehicle.

If the vehicle is traveling directly towards the radar, the measured speed would be the real speed with $\theta=0°$. However, in practical scenarios, as shown in FIG. 1, the vehicle will typically not travel directly towards the detector. Hence, the angle changes, which, in turn, results in an estimated speed that is different than the actual speed. This phenomenon is called the Cosine Effect, where the cosine of the angle that is between the vehicle's direction of motion and the radar is relating the calculated speed of the vehicle and the real speed. As expected, as the angle increases the estimation error increases, i.e., the detector provides less accurate results.

In addition, the cosine effect impacts the accuracy of RADAR/LiDAR detectors in curved roads as depicted in FIG. 3. The relation in can be expressed for curved roads [18]:

$$V_{m,curved} = V_a \sin\left\{\frac{\pi}{2} - \beta + \tan^{-1}\frac{d_{st} + r_c(1-\cos\beta)}{R_{st} + r_c\sin\beta}\right\}$$

where $\beta$ and $r_c$ are the angle and the radius of the curved road, respectively. Since the angle ($\theta$) is changing fast in curved roads, microwave and laser radars cannot measure the speed accurately. Fast angle changes cause the relative speed to change too quickly for either RADAR or LiDAR to measure with accuracy.

Turning next to FIG. 9, in practice an embodiment might be implemented as follows. As an initial step, the ViLDAR system will be calibrated and certain constants will be initialized 905 that would be useful in the velocity determination calculation. For example, a value of the parameter K will be determined, where K is a constant that reflects various gains and losses due to environmental factors. More specifically, in the current embodiment K represents the minimum path loss at the reference distance, which is considered to be 1 meter in this example.

Additionally, gamma (the channel path-loss exponent or the power's rate of change as a function of distance), and d (the distance between the vehicle's line of motion and the position of the photodetector) will be need to be determined. Note that, although these are the preferred constants to determine, different formulations of the equations presented above might result in more or fewer constants that need to be estimated.

The parameter K depends on the amount of environmental lighting, the specifications of the light source (e.g., LED light) and the photodetector, and the distance to the road (d), among others, and typically would be measured in the field as part of an initial calibration process (box 905). Similarly, the gamma, y, parameter could be estimated by taking measurements at different distances and then using standard curve fitting techniques (e.g., least squares or minimum mean square error, minimum absolute deviation, etc.) to estimate its value. With respect to the parameter d, that could be measured in the field.

By way of examples only, K, in the linear domain, would typically be less than 1.0, whereas in the decibel domain its value might be $K_{dB}<0$, e.g., it might be between −30 and −60 dB. An acceptable value for gamma would be between about 1 and 2, although the typical range might be between 1 and 5. The parameter d will obviously depend on the geometry of the measurement situation but, in practice, it will likely be the parameter with minimal impact on the calculated result. In some cases it will be between about 0.5 and 2.0 meters.

In order to initiate measurement, the light(s) of a vehicle will be acquired by the operator of the photodetector device (box 910). In connection with the acquisition of the lights, certain program variables will be initialized. In box 915 a time parameter (t) and a counter (n) are initialized to zero.

Continuing with the present example, $P_r(t)$ will be acquired at time zero using the photodetector (box 930). Using that value and the constants described previously, it will be possible to calculate the quantity indicated in box 935 and described previously. Although two measurement readings would be enough in theory to estimate the velocity of the vehicle, in practice the results would be more reliable if many more measurements were obtained. The parameter n in FIG. 9 (box 942) represents the number of samples that will be used to estimate the velocity. The parameter $n_{min}$ is used in this example to limit calculation of the velocity to those instances where enough samples have been acquired (box 940). Of course, those of ordinary skill in the art will readily be able to determine an appropriate value for $n_{min}$, in a particular situation.

If a sufficient number of samples have been obtained, the velocity will be calculated (box 945) and displayed to the user (box 950) using, by way of example only, a display device that utilizes a technology such as LED, LCD, OLED, etc. The display device might be integral to the photodetector 110 or it could be a separate display (e.g., a computer screen or tablet screen, etc.) that uses a wireless or wired connection. If additional readings are required, in some embodiments the software will increment the sample counter (box 925) and the time period since time zero (box 920) and acquire additional samples that will be added to those already collected and the combined dataset used to recalculate the velocity (boxes 945 and 950). In other embodiments, the logic might branch back up to box 915, if the idea was to acquire a second/independent measurement of velocity. This might be useful in instances where it is desirable to have a new sample dataset be collected so that bad data (e.g., data containing obvious outliers) that was included in one estimate not be utilized in a subsequent estimate.

In some embodiments, the time interval between successive measurements might be 0.001 seconds (e.g., 1,000 Hz). In other embodiments the sample interval might be 0.01 seconds (100 Hz), although those of ordinary skill in the art will recognize that the choice of sample rate might be higher or lower than these examples and such an individual will readily be able to choose a sample rate that is appropriate for a particular scenario.

Finally, note that not shown in FIG. 1 is a computer (e.g., laptop, tablet computer, cell phone, etc.) or any other similar device with a CPU that is capable of executing a computer program of the sort described below. Of course, the CPU might be internal to the photodetector 110. The computer will be in electronic communication (wired or wireless) with the photodetector 110 and able to receive and interpret analog or digital signals therefrom. In some cases, the output from the photodetector might be a voltage or current value, although in other cases it could be a digital value that represents the intensity of the light received by the CCD, CMOS, etc., or other hardware element capable of sensing an amount of received light. That being said, for purposes of the instant disclosure when the term "received optical power" is used herein, that term should be broadly construed to include analog (e.g., watts, volts, etc.) or digital signals available for reading by a CPU that are related to the power of the optical signal sensed by the photodetector 110.

Additionally, it might be useful in some embodiments to have the photodetector equipped with a display device so that the individual who is manning the detector 110 can verify which automobile that the photodetector 110 is currently sensing, ensure that that photodetector is continuing to follow the tracked vehicle, that the light(s) from the vehicle is clearly visible, etc. Additionally, some sort of representation of the calculated velocity of the auto will often be printed on the display device 100 or a computer computer screen.

Further, the photodetector might be equipped with optics to extend its effective range, increase the signal strength of the lights from the vehicle, decrease or increase its field of view, etc. Unless otherwise indicated, the term "photodetector" should be broadly construed to at least include the necessary associated optics to allow it to function in practice. Those of ordinary skill in the art will readily understand how to configure the optics to suit a given scenario. The photodetector 110 could also include an internal CPU, memory, etc., for purposes of calculating the speed or, in other variations, it could be in communication with a separate device having a CPU, memory, etc., that performs the speed calculations based on data from the photodetector 110. For purposes of the instant disclosure, the term "CPU" should be broadly construed to include an internal CPU having some amount of memory, or a separate computer (e.g., laptop, tablet, smart phone, etc.) of the sort described above.

Simulation Results

The simulation results are presented below to confirm the analytical results and investigate the impact of various system parameters on the performance of ViLDAR. In simulations, perfect estimation of the channel model parameters is assumed. Initially, the vehicle is at some distance to the point where the range and the distance are almost equal. That is to say, the angle of incidence (θ) is approximately zero.

The following parameters are used in the simulations:
The vehicle speed is constant with 72 km/hr unless otherwise stated.
The estimation duration ($\Delta t_{est}$) is 0.2 s unless otherwise stated.
The distance between the ViLDAR unit and the vehicle's line of motion (d) is 0.5 m.
The half power angle $\phi_{1/2}$ of the vehicle is 45°.
The ViLDAR starts measuring the power from range ($R_0$) equals to 15 m.
Every 1 ms, the ViLDAR captures a new measurement.
The transmitter power is assumed to be constant with −70 dBm=−100 dB.
The channel path loss exponent (γ) is assumed for purposes of the instant embodiment to be constant with value 2.

Figure 4:
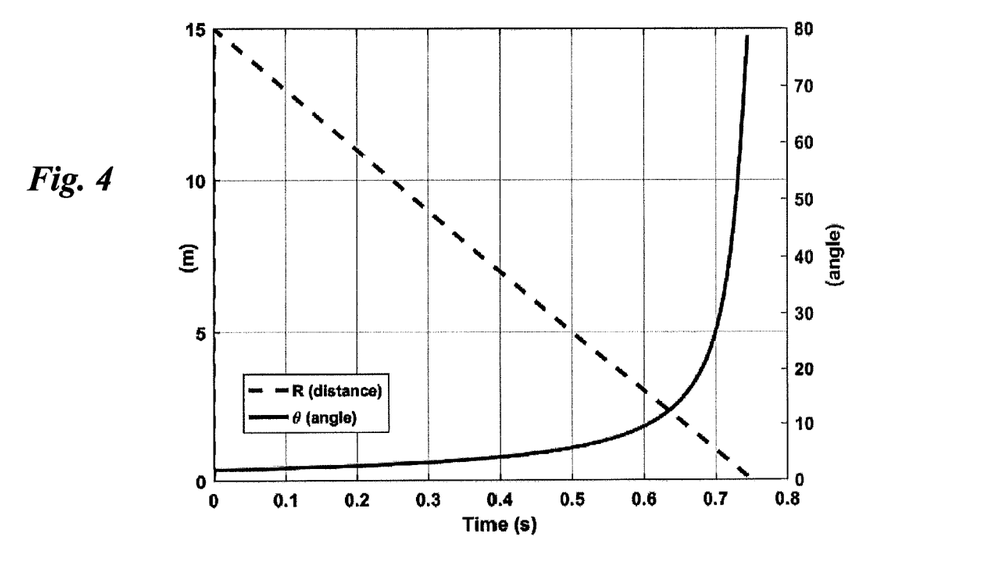
FIG. 4 contains an example of the incidence angle and range of the vehicle assuming initial at $R_0=15$ m; Speed=72 km/hr; d=0.5 m.

In FIG. 4, the change in the incidence angle (θ(t)) and distance (R(t)) with simulation time is shown. As expected, as time increases the vehicle approaches the ViLDAR. Therefore, the range decreases and θ(t) increases until it reaches the ViLDAR.

Figure 5:
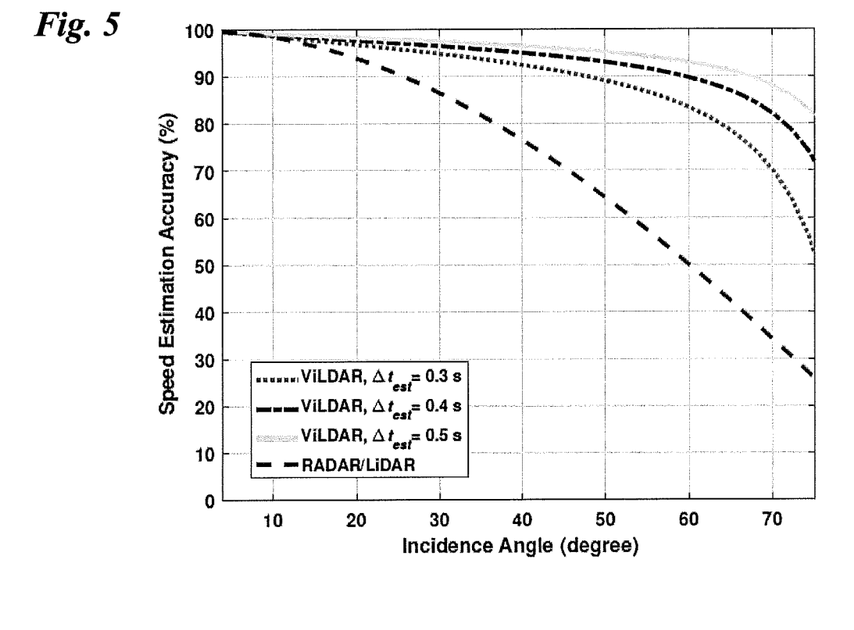
FIG. 5 provides an example of the percentage of speed estimation for different estimation duration for ViLDAR and comparison with RADAR/LiDAR with Speed=144 km/hr.

In FIG. 5, the performance comparison of ViLDAR with the theoretical limit of the RADAR/LiDAR is provided. In this embodiment, the proposed ViLDAR system provides better speed estimation accuracy for a wide range of incidence angles. This improvement is attributed at least in part to the fact that ViLDAR has lower dependency on the incidence angle as compared with the RADAR/LiDAR systems. Further, the approach taught herein is a one-way signal model which is less susceptible to noise and path-loss. In addition, as the estimation duration increases, better performance results are achieved in different incidence angles.

Figure 6:
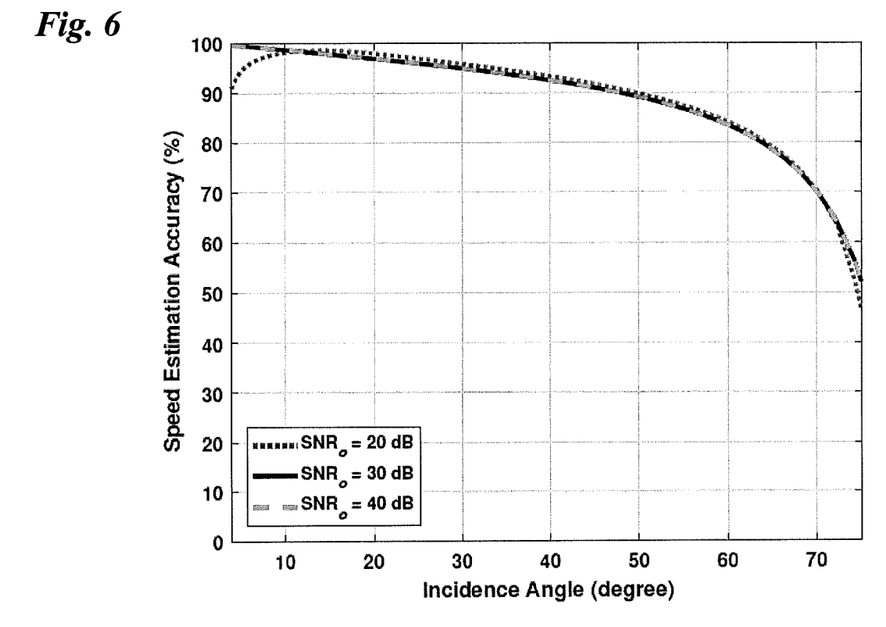
FIG. 6 contains an exemplary plot of the percentage of the speed estimation for different initial SNR values.
Figure 7:
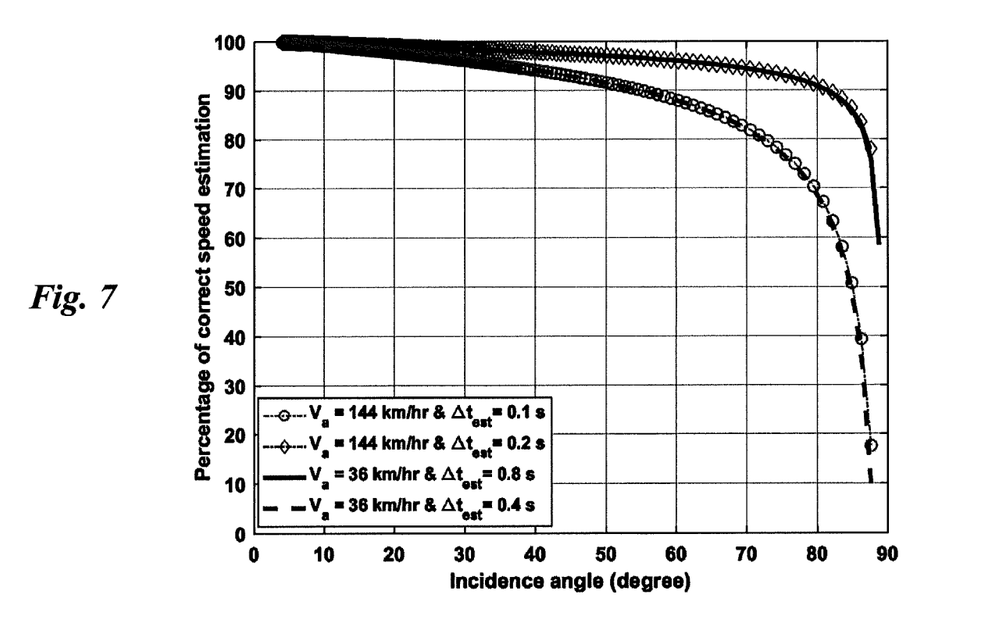
FIG. 7 provides an example of the percentage of the estimated speed using simple LS method for different actual speed values.

FIG. 6 provides the impact of SNR levels at the initial point of measurements on the estimation accuracy. As expected, even at low incidence angles, there is performance degradation due to low SNR level. In addition, to further validate the performance of ViLDAR speed estimation method, the percentage of correct estimation for different speed levels and estimation durations is provided in FIG. 7. Similar to the observations in FIG. 5, the proposed algorithm works at different speed levels, while the performance is impacted primarily by the estimation duration.

Comparison and Remarks

A comparison between ViLDAR and RADAR gun (Table I), and potential extensions of an embodiment are provided a below.

TABLE II

Comparison of ViLDAR and RADAR.

|  | ViLDAR | RADAR |
| --- | --- | --- |
| Range of incident angle accuracy | High | Low |
| Range | Low (Up to 100 m) | High (Up to 1 km) |
| Beam-width | Wide (FOV) | Narrow |
| Environment dependency | Sensitive | Moderate |
| Ambient light | Sensitive | Not affected |
| EMI (Electro-magnetic Interference) | No | Yes |
| Band license | Unlicensed | Licensed/Unlicensed |
| Detectable by drivers | No | Yes |
| Cost | Low | High |
| Size | Small | Large |
| Power consumption | Low | High |

As is indicated in Table II, ViLDAR gives more flexibility in terms of the angle of incidence and beam-width with same high accuracy percentage. In terms of size, ViLDAR is expected to be much smaller as it only needs a photo detector, which can be quite compact. On the other hand, RADAR gun systems need to have a transceiver module and an antenna which depends on the frequency of operation. One of the main advantages of ViLDAR is that its presence cannot be detected by targeted drivers because it is based on a one-way signal model, i.e., it is a passive system. In addition, some limitations that need to be considered in the future work is the channel model estimation in real time and the performance during different light and environment scenarios. Because light waves have a higher frequency than the RF signal that is used in radar, the operating range in ViLDAR will potentially be smaller than RADAR unless steps are taken to extend it.

Those of ordinary skill in the art will recognize that the approach disclosed herein, although discussed in terms of LED headlights, could be, adapted to other sorts of headlights (e.g., Halogen, Xenon, Laser, etc.).

Finally, during daylight hours various embodiments of the instant disclosure could be used to estimate vehicle velocity if, for example, the subject vehicle was equipped with daytime running lights. However, in that case when an embodiment is utilized during the daylight hours (e.g., by focusing the photodetector's optics on daytime running lights) it is possible that there might be some performance degradation. That being said, those of ordinary skill in the art will be readily able to modify the approaches discussed above to improve the reliability of the velocity estimates obtained thereby.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number.

For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

REFERENCES

1. A. J. Suzuki and K. Mizui, "Laser radar and visible light in a bidirectional v2v communication and ranging system," in 2015 IEEE International Conference on Vehicular Electronics and Safety (ICVES), November 2015, pp. 19-24.
2. A. M. Cilean, B. Cagneau, L. Chassagne, M. Dimian, and V. Popa, "Novel receiver sensor for visible light communications in automotive applications," IEEE Sensors Journal, vol. 15, no. 8, pp. 4632-4639, August 2015.
3. Z. Wu, J. Chau, and T. Little, "Modeling and designing of a new indoor free space visible light communication system," in 2011 16th European Conference on Networks and Optical Communications, July 2011, pp. 72-75.
4. T. Komine and M. Nakagawa, "Performance evaluation of visible light wireless communication system using white led lightings," in Proceedings. ISCC 2004. Ninth International Symposium on Computers And Communications (IEEE Cat. No. 04TH8769), vol. 1, June 2004, pp. 258-263 Vol. 1.
5. W. Viriyasitavat, S. H. Yu, and H. M. Tsai, "Short paper: Channel model for visible light communications using off-the-shelf scooter taillight," in 2013 IEEE Vehicular Networking Conference, December 2013, pp. 170-173.
6. M. Richards, W. Holm, and J. Scheer, Principles of Modern Radar: Basic Principles, ser. Electromagnetics and Radar. Institution of Engineering and Technology, 2010. [Online]. Available: https://books.google.com/books?id=veOngEACAAJ
7. P. D. Fisher, "Improving on police radar," IEEE Spectrum, vol. 29, no. 7, pp. 38-43, July 1992.
8. D. Mennie, "Consumer electronics: Helping speeders beat the radar rap: Moving radar and dual-band detectors constitute a miniature ecm race between enforcement-minded authorities and motoring outlaws," IEEE Spectrum, vol. 15, no. 8, pp. 38-42, August 1978.
9. D. Sawicki, Traffic Radar Handbook: A Comprehensive Guide to Speed Measuring Systems. AuthorHouse, 2002. [Online]. Available: https://books.google.com/books?id=P28AAAAACAAJ.
10. W. Kim, "Lidar sensor system," Feb. 21, 2017, U.S. Pat. No. 9,575,164. [Online]. Available: https://www.google.com/patents/U.S. Pat. No. 9,575,164.
11. R. Gammenthaler, "Lidar measurement device for vehicular traffic surveillance and method for use of same," Sep. 29, 2015, U.S. Pat. No. 9,146,316. [Online]. Available: https://www.google.com/patents/U.S. Pat. No. 9,146,316.
12. J. Aker, "Vehicular traffic surveillance doppler radar system," Feb. 19, 2013, U.S. Pat. No. 8,378,884. [Online]. Available: https://www.google.com/patents/U.S. Pat. No. 8,378,884.
13. A. Lipson, "Low cost small size lidar for automotive," Aug. 6, 2015, U.S. patent application Ser. No. 14/612,605. [Online]. Available: https://www.google.com/patents/US20150219764.

What is claimed is:

1. An apparatus for determining the speed of a vehicle, comprising,
    (a) a photodetector, said photodetector at least for emitting a signal representative of a light power received thereby;
    (b) a CPU in electronic communication with said photodetector, said CPU at least for reading a signal from said photodetector;
    (c) a display device in electronic communication with said CPU;
    (d) computer memory in communication with said CPU, said computer memory containing a plurality of commands for executing at least the following steps
        (1) determining values for K, γ, and d, where,
            K is a constant value that represents a minimum path loss at a reference distance,
            γ is a constant that represents a light power's rate of change as a function of distance, and,
            d is a constant that represents a distance between the vehicle's line of motion and a position of the photodetector;
        (2) reading said photodetector, thereby acquiring a $P_r(t)$ value, where $P_r(t)$ is a power level received from the vehicle at a time t;
        (3) performing step (2) a plurality of times, thereby acquiring a plurality of different $P_r(t)$ values at a plurality of different time values;

(4) using at least said determined values for K, γ, and d, and said plurality of $P_r(t)$ values to obtain an estimate of said speed of said vehicle by solving the equation:

$$\sqrt{\left(\frac{P_r(t)}{K}\right)^{\frac{-2}{\gamma}} d^2} = Vt + R_o,$$

for V and $R_0$, where

V is an estimate of said speed of said vehicle, and, $R_0$ is an initial range between the vehicle and said photodetector; and (5) displaying said speed estimate to a user using said display device.

2. The apparatus according to claim 1, wherein said display device is selected from the group consisting of an LED display device, an LCD display device, and an OLED display device.

3. The apparatus according to claim 1, wherein said reference distance is 1 meter.

4. The apparatus according to claim 1, wherein K is less than 1.0.

5. The apparatus according to claim 1, wherein 1<γ<5.

6. A method for determining the speed of a vehicle, wherein is provided a photodetector, comprising the steps of:

(a) determining values for K, γ, and d, where,

K is a constant value that represents a minimum path loss at a reference distance, γ is a constant that represents a light power's rate of change as a function of distance, and, d is a constant that represents a distance between the vehicle's line of motion and a position of the photodetector;

(b) reading said photodetector, thereby acquiring a $P_r(t)$ value, where $P_r(t)$ is a power level received from the vehicle at a time t;

(c) performing step (b) a plurality of times, thereby acquiring a plurality of different $P_r(t)$ values at a plurality of different time values;

(d) using at least said determined values for K, γ, and d, and said plurality of $P_r(t)$ values to obtain an estimate of said speed of said vehicle by solving the equation:

$$\sqrt{\left(\frac{P_r(t)}{K}\right)^{\frac{-2}{\gamma}} d^2} = Vt + R_o,$$

for V and $R_0$, where

V is an estimate of said speed of said vehicle, and, $R_0$ is an initial range between the vehicle and said photodetector; and (e) displaying said speed estimate to a user using a display device in electronic communication with said photodetector.

7. The method according to claim 6, wherein said display device is selected from the group consisting of an LED display device, an LCD display device, and an OLED display device.

8. The method according to claim 6, wherein step (d) comprises the step of:

(d1) using at least said accessed values for K, γ, and d, and said plurality of $P_r(t)$ values, to obtain an linearized estimate of said speed of said vehicle.

9. The method according to claim 6, wherein said reference distance is 1 meter.

10. The method according to claim 6, wherein K is less than 1.0.

11. The method according to claim 6, wherein 1<γ<5.

12. An apparatus for determining the speed of a vehicle, comprising, (a) a photodetector, said photodetector at least for emitting a signal representative of a light power received thereby;

(b) a CPU in electronic communication with said photodetector, said CPU at least for reading a signal from said photodetector;

(c) a display device in electronic communication with said CPU;

(d) computer memory in communication with said CPU, said computer memory containing a plurality of commands for executing at least the following steps (1) determining values for K, γ, and d, where, K is a constant value that represents a minimum path loss at a reference distance, γ is a constant that represents a light power's rate of change as a function of distance, and, d is a constant that represents a distance between the vehicle's line of motion and a position of the photodetector;

(2) reading said photodetector, thereby acquiring a $P_r(t)$ value, where $P_r(t)$ is a power level received from the vehicle at a time t;

(3) performing step (2) a plurality of times, thereby acquiring a plurality of different $P_r(t)$ values at a plurality of different time values;

(4) using at least said determined values for K, γ, and d, and said plurality of $P_r(t)$ values to obtain an estimate of said speed of said vehicle by solving the equation:

$$\sqrt{\left(\frac{P_r(t)}{K}\right)^{\frac{-2}{\gamma}} d^2} = Vt + R_o,$$

for V and $R_0$, where

V is an estimate of said speed of said vehicle, and, $R_0$ is an initial range between the vehicle and said photodetector;

(5) displaying said speed estimate to a user using said display device.

13. The apparatus according to claim 12, wherein said reference distance is 1 meter.

14. The apparatus according to claim 12, wherein K is less than 1.0.

15. The apparatus according to claim 12, wherein 1 <γ<5.

* * * * *

UNITED STATES PATENT AND TRADEMARK OFFICE
CERTIFICATE OF CORRECTION

PATENT NO. : 10,768,194 B2
APPLICATION NO. : 16/057239
DATED : September 8, 2020
INVENTOR(S) : Abuella et al.

Page 1 of 1

It is certified that error appears in the above-identified patent and that said Letters Patent is hereby corrected as shown below:

In the Specification

Column 1 Line 12 insert:
--This invention was made with U.S. Government support under DOT Grant No. 69A3551747106 awarded by the Department of Transportation. The Government has certain rights in this invention.--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*